United States Patent
Asada

(10) Patent No.: US 6,706,450 B2
(45) Date of Patent: Mar. 16, 2004

(54) SEPARATOR FOR SEALED LEAD ACID BATTERY

(75) Inventor: Atsushi Asada, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 392 days.

(21) Appl. No.: 09/947,468

(22) Filed: Sep. 7, 2001

(65) Prior Publication Data

US 2002/0028386 A1 Mar. 7, 2002

Related U.S. Application Data

(63) Continuation of application No. PCT/JP99/07091, filed on Dec. 16, 1999.

(30) Foreign Application Priority Data

Mar. 15, 1999 (JP) .......................................... 11-068629

(51) Int. Cl.$^7$ ................................................. H01M 2/16
(52) U.S. Cl. ...................... 429/251; 429/252; 429/255; 429/247; 429/248; 429/249; 429/129
(58) Field of Search ................................ 429/251, 252, 429/255, 247, 248, 249, 129

(56) References Cited

U.S. PATENT DOCUMENTS 5,009,971 A    4/1991   Johnson et al.

FOREIGN PATENT DOCUMENTS

| JP | 60-221954 | | 11/1985 | |
| JP | 63-224144 | | 9/1988 | |
| JP | 64-52375 | | 2/1989 | |
| JP | 4-22061 | | 1/1992 | |
| JP | 04-022061 | * | 1/1992 | ............ H01M/2/16 |

* cited by examiner

*Primary Examiner*—Patrick Ryan
*Assistant Examiner*—Angela J Martin
(74) *Attorney, Agent, or Firm*—Kanesaka & Takeuchi

(57) ABSTRACT

A separator for a valve-regulated lead acid battery consists mainly of fine glass fibers. The separator includes inorganic powder in an amount of 5 to 30% by weight and natural pulp in an amount of 3 to 20% by weight, and has a density of not less than 0.165 g/cm$^3$. The separator sufficiently suppresses the occurrence of electrical short circuits between the positive and negative electrode plates.

11 Claims, No Drawings

SEPARATOR FOR SEALED LEAD ACID BATTERY

CROSS REFERENCE TO RELATED APPLICATION

This is a continuation application of PCT/JP99/07091 filed on Dec. 16, 1999.

FIELD OF THE INVENTION

The present invention relates to a separator for a valve-regulated lead acid battery. More particularly, it relates to a separator for a valve-regulated lead acid battery, which is mainly made of fine glass fibers and also includes inorganic powder and natural pulp in order to improve its property of suppressing short circuits between positive and negative electrode plates of the battery.

BACKGROUND OF THE INVENTION

A conventional separator for a valve-regulated lead acid battery has a shape of a sheet, and contains glass fibers as the main component. A conventional separator is occasionally penetrated or ripped by local pressure given from a salience on an electrode plate or by crystal growth of lead in the separator during charging thereof, which causes a short circuit between positive and negative electrode plates and interrupts electrical charge or discharge of the battery. This is because the conventional separator does not have a sufficient mechanical strength, so that it is easily penetrated or ripped by the salience on the electrode plate, and because the conventional separator has a relatively low density and contains relatively large pores to easily allow crystal growth. With a thinner conventional separator, a short circuit occurs more often because the decrease of the thickness makes the mechanical strength of the separator weaker and the positive and negative electrode plates closer.

Increasing density and decreasing pore size and/or pore volume in a separator may prevent crystal growth of lead and also prevent an electrical short circuit. It is one possible way to increase the density and decrease the pore size and/or pore volume of the separator that the separator includes particles of inorganic powder such as silica powder between the glass fibers. However, when the separator includes the inorganic powder, the relative amount of the glass fibers becomes less and interlacing of the glass fibers is reduced. As a result, the mechanical strength of the separator is decreased, so that a short circuit caused by pressure from salience of the electrode plates becomes easy to occur.

Increasing the mechanical strength of a separator can prevent another cause, penetration or ripping of the separator. Japanese patent publications S54-22531A, S56-99968A, and S58-663B describe to mix synthetic fibers with glass fibers for strengthening the separator. However, since the synthetic fiber is less hydrophilic than the glass fiber, the separator including the synthetic fibers has a drawback of lower liquid absorbency and liquid retention for sulfuric acid solution.

Japanese patent publication S64-52375A discloses a separator including beaten cellulose to improve its mechanical strength without lowering its liquid absorbency or liquid retention. However, beaten cellulose brings only a slight change in the density of the separator so that it does not prevent short circuits caused by crystal growth of lead.

OBJECT AND SUMMARY OF THE INVENTION

It is an object of the present invention to overcome disadvantages described above and to provide a separator for a valve-regulated lead acid battery which is mainly made of fine glass fibers and also includes inorganic powder and natural pulp in order to improve the property of suppressing the short circuits between the positive and negative electrode plates of the battery, and, further, which has an increased density to make the separator thinner and applicable to flat electrode plates.

A separator for a valve-regulated lead acid battery of the present invention is mainly made of fine glass fibers and includes inorganic powder and beaten natural pulp. The separator contains 5 to 30% by weight of the inorganic powder and 3 to 20% by weight of the natural pulp. The density of the separator is equal to or more than 0.165 g/cm$^3$.

An electrical short circuit between positive and negative electrode plates in a valve-regulated lead acid battery occurs mostly due to the following two causes;

[1] Mechanical Short Circuit

A salience on an electrode plate (unevenness of a grid, granule of active material, and the like) gives local pressure or shearing force to a separator. When the separator is not strong enough, the salience penetrates or rips the separator and reaches the opposite plate to cause a short circuit.

[2] Electrochemical Short Circuit

At the end of electrical discharging of the battery, sulfate ions in electrolyte are consumed and the electrolyte becomes almost pure water, whereby the electrolyte is increased in its solubility of the lead ion. Consequently, a part of lead sulfate formed on the positive and negative electrode dissolves into the electrolyte. When the battery is charged after that, lead ions in the electrolyte are reduced on the negative plate and lead is deposited thereon and crystallized. The lead crystal grows into the separator until it reaches the opposite plate to cause a short circuit.

In the present invention, in order to suppress the occurrence of short circuits due to the above cause [2], inorganic powder such as silica powder is mixed into the separator to decrease the size of pores in the separator and increase the density of the separator. Furthermore, beaten natural pulp is mixed into the separator to improve the tensile strength and the durability to penetration so that short circuits due to the above cause [1] is suppressed. Since both inorganic powder and natural pulp are highly hydrophilic, the performance of the separator is not reduced.

The separator of the present invention suppresses effectively the short circuit due to the above two causes. The separator can be produced in one process, thereby lowering the production cost.

Furthermore, since the separator of the present invention has a relatively high density, it can be thinner and successfully applicable to flat electrode plates placed in a small distance from 0.3 to 0.7 mm.

In the present invention, acid resistant glass fibers having a mean fiber diameter of not greater than 1 μm are suitable for the fine glass fibers and the silica powder having a specific surface area of not less than 100 m$^2$/g is suitable for the inorganic powder. Natural pulp to be used is preferably beaten to have the Canadian freeness of 250 mL or less.

DETAILED DESCRIPTION OF THE PREFERRED EMBODIMENTS

Hereinafter, preferred embodiments of the present invention will be described in detail.

The separator for a valve-regulated lead acid battery of the present invention is mainly made of fine glass fibers, includes inorganic powder in an amount of 5 to 30% by weight and beaten natural pulp in an amount of 3 to 20% by weight, and has a density of 0.165 g/cm$^3$ or higher.

The fine glass fibers are preferably acid resistant glass fibers, more preferably alkali-contained glass fibers with good acid resistance and having a mean fiber diameter equal to or smaller than 1 μm. The separator includes the fine glass fibers preferably in a range from 50 to 92% by weight. Fine glass fibers with a mean fiber diameter larger than 1 μm have lower liquid retention and sheet-formability. When the separator includes the fine glass fibers in an amount of less than 50% by weight, the separator does not have a good liquid retention. More than 92% by weight of the fine glass fibers results in relatively small amounts of inorganic powder and natural pulp, whereby the separator is not fully prevented from short circuits.

When the amount of the inorganic powder is less than 5% by weight, the occurrence of short circuits is not suppressed successfully. More than 30% by weight of the inorganic powder means relatively small amounts of the fine glass fiber and the natural pulp, whereby the separator does not have enough high mechanical strength. Therefore, the amount of inorganic powder is preferably in a range from 5 to 30% by weight.

Silica, titanium dioxide and diatomaceous earth can be used as the inorganic powder. Silica powder having a specific surface area equal to 100 m$^2$/g or larger is most suitable because of its high hydrophilic property and low cost. Silica powder having a specific surface area equals to 100 m$^2$/g or more have enough pores inside and on surfaces thereof so as to give sufficient liquid retention to the separator.

When the separator includes beaten natural pulp of less than 3% by weight, the separator does not have enough high mechanical strength since the separator includes the inorganic powder which reduces the mechanical strength of the separator, whereby the separator is not prevented from short circuits fully. While, when the amount of beaten natural pulp exceeds 20% by weight, the separator becomes too hard to maintain the adhesion with electrode plates. Therefore, beaten natural pulp is preferably included in the separator in an amount of 3 to 20% by weight.

Among the natural pulp, it is suitable to use soft wood pulp beaten by a beater or the like. The soft wood pulp has long fiber length and is homogeneous so that it can be very effective in reinforcing the separator. The soft wood pulp is preferably beaten to the extent of 250 mL or less in the Canadian freeness (the Canadian standard freeness), more preferably 150 mL or less, at a concentration of 0.3% by weight. (For reference, freeness of unbeaten natural pulp is 600 mL or more.) Natural pulp beaten to the extent of such freeness has a very large specific surface area and pore volume, several times as large as those of ordinary pulp do. And it has good reactivity, hydrophilic property, liquid retention and acid resistance, and further, it works very effectively as reinforcement. Consequently, even a small amount of such beaten natural pulp is enough to improve strength and hardness of a separator sufficiently, and that small amount of pulp cannot ruin liquid retention and liquid absorbency of the separator.

In the present invention, a part of natural pulp can be substituted by fibrillated cellulose, which is natural pulp finely divided into the size of microfibril and effective to improve mechanical strength of the separator. When the amount of fibrillated cellulose substituted for natural pulp is more than 5% by weight, the separator becomes too hard and thus loses its adhesive quality with the electrode plates. Therefore, the amount of the fibrillated cellulose should be not greater than 5% by weight and the total amount of fibrillated cellulose and beaten natural pulp should be not greater than 20% by weight.

The separator of the present invention is produced by mixing the above compositions in the ratio that makes the density of the separator 0.165 g/cm$^3$ or more, preferably in a range 0.165–0.250 g/cm$^3$, and, then, making sheet of the mixture.

In the present invention, when the density of the separator is lower than 0.165 g/cm$^3$, the separator includes a lot of pores. That means such a separator having the density of lower than 0.165 g/cm$^3$ can not sufficiently suppress the short circuits when it is thin to be adapted to flat electrode plates. While, when the separator has the density of higher than 0.250 g/cm$^3$, liquid retention of the separator is lowered. Therefore, the separator has the density preferably in a range from 0.165 to 0.250 g/cm$^3$.

The separator of the present invention has such a high density that it prevents short circuits of the battery effectively, even when the thickness thereof is as small as 0.4 to 0.8 mm, wherein the thickness is determined by the method of measurement described later with regard to Examples.

The separator of the present invention is very useful for flat electrode plates.

Hereinafter, the present invention will be described in detail with reference to examples and comparative examples. It is to be understood that the present invention is not limited to the following examples.

Materials used in the examples and comparative examples are given below.

Materials

Glass fiber: alkali-containing glass fiber having a mean fiber diameter of 0.8 μm.

Powder: silica powder having a specific surface area of about 200 m$^2$/g.

Beaten natural pulp: soft wood pulp beaten to the extent of about 150 mL in the Canadian freeness.

Thermoplastic organic fiber: polyester fiber having a mean fiber diameter of about 20 μm and a fiber length of about 5 m.

EXAMPLES 1 AND 2, AND COMPARATIVE EXAMPLES 1–4

Samples of separators for valve-regulated lead acid batteries were prepared with compositions given in Table 1. Characteristics of the samples were measured by the following methods and the results are given in Table 1.

i) Thickness [mm] and Density [g/cm$^3$]

Thickness T of each sample was measured under a pressure of 0.2 kgf/cm$^2$ (20 kPa) applied through the thickness thereof according to SBA4501. Density of each sample was calculated by the formula W/(T×S), where T is a thickness measured as the above, W is mass measured by an electronic balance, and S is an area.

ii) Tensile strength [gf/10 mm$^2$(N/10 mm$^2$)]

Tensile strength of each sample was measured according to SBA4501.

iii) Strength against penetration

Strength of each sample against penetration was estimated by the following method: to press a needle having a diameter of 1 mm and a spherical tip thereof vertically against the fixed sample at a speed of 120 mm/min; and to measure a maximum load applied to the needle at the moment when the needle stuck the sample thereinto. Since the maximum load was easily affected by a slight difference in shapes of needle tips, the measured maximum load was compared relatively with the maximum load of the standard sample (Comparative Example 1), which was set to 100.

iv) Liquid absorbency [mm/min]

Liquid absorbency of each sample was measured in the following manner: immerse the bottom of a sample vertically into a dilute solution of sulfuric acid having a specific gravity of 1.30; measure a rise of the solution soaking into the sample in one minute after it was immersed.

v) Electrochemical short circuit time

A sample separator having 0.5 mm of thickness was disposed in between two flat electrode plates with 7 mm$^2$ of area, and they were soaked into a saturated solution of lead sulfate. Then, a constant voltage of 10V was applied to the sample under 0.3 kgf/m$^2$(3 Pa) of pressure. When metallic lead which grew from the negative plate and reached the positive plate, electrical resistance between the electrode plates dropped remarkably. Measure the elapsed time from applying the voltage to the remarkable drop of the resistance. Divide the measured time by the thickness of the separator to obtain a measured electrochemical short circuit time. The measured electrochemical short circuit time of each sample was compared with the result of the standard sample (Comparative Example 1), which was set to 100.

Among the above characteristics, strength against penetration is a barometer of the occurrence of mechanical short circuits. The stronger a separator is against penetration, the more durable it is against mechanical short circuits. The separator is better at preventing electrochemical short circuits, if it has a longer electrochemical short circuit time.

TABLE 1

|  | Examples | | Comparative Examples | | | |
| --- | --- | --- | --- | --- | --- | --- |
|  | 1 | 2 | 1 | 2 | 3 | 4 |
| Compositions (% by weight) | | | | | | |
| Glass fiber | 80 | 75 | 100 | 80 | 75 | 90 |
| Silica powder | 10 | 20 | — | — | 20 | — |
| Beaten pulp | 10 | 5 | — | — | — | 10 |
| Thermoplastic organic fiber | — | — | — | 20 | 5 | — |
| Characteristics | | | | | | |
| Thickness(mm) | 0.5 | 0.5 | 0.5 | 0.5 | 0.5 | 0.5 |
| Density(g/cm$^3$) | 0.18 | 0.20 | 0.14 | 0.15 | 0.20 | 0.15 |
| Tensile strength (gf/10mm$^2$) | 480 | 360 | 440 | 660 | 300 | 720 |
| (N/10mm$^2$) | 4.7 | 3.5 | 4.3 | 6.5 | 2.9 | 7.1 |
| Strength against penetration* | 190 | 120 | 100 | 270 | 70 | 200 |
| Liquid absorbency(mm/min) | 50 | 50 | 50 | 40 | 45 | 50 |
| Electrochemical short circuit time* | 4500 | 6000 | 100 | 250 | 1600 | 300 |

*: Relative values in setting results of Comparative example 1 to 100.

As shown in Table 1, the sample of Comparative Example 1 composed only of glass fibers is not strong against penetration and has a short electrochemical short circuit time. The sample of Comparative Example 2 composed of glass fibers and organic fibers is relatively strong against penetration, yet has a relatively short electrochemical short circuit time and poor liquid absorbency. The sample of Comparative Example 3 composed of glass fibers, silica powder and organic fibers has a long electrochemical short circuit time, yet is very weak against penetration. The sample of Comparative Example 4 composed of glass fibers and beaten pulp is very strong against penetration and good at liquid absorbency, yet has a relatively short electrochemical short circuit time.

On the other hand, each sample of Examples 1 and 2 composed of glass fibers, silica powder and beaten pulp in the ratio given in Table 1 is very strong against penetration and has a long electrochemical short circuit time without lowering liquid absorbency. Therefore, these separators are very good at preventing short circuits.

INDUSTRIAL APPLICABILITY

As detailed above, according to the present invention, the following advantages (1) to (4) are given to the separator, so that the separator sufficiently suppresses the occurrence of short circuits between positive and negative electrode plates and has excellent qualities as a separator such as liquid absorbency and a low production cost. The separator of the present invention is exceedingly useful when it is made thin to use for a separator between flat electrode plates.

(1) The separator has high density because of inorganic powder retained among glass fibers. The inorganic powder in the pore of the separator prevents crystal growth of metallic lead. Microfilament of beaten natural pulp works in the same way with the inorganic powder. As a result, an electrical short circuit caused by crystal growth of metallic lead is suppressed.

(2) Beaten natural pulp makes an improvement in mechanical strength of a separator, especially in strength against penetration. Therefore, the separator cannot be easily penetrated nor ripped by local pressure caused by salience of electrode plates.

(3) Since the separator consists of hydrophilic materials only, it has an excellent hydrophilic property and liquid retention so that the battery has an excellent performance.

(4) The separator can be easily produced through one process of mixing and making sheet to allow a low production cost.

What is claimed is:

1. A separator for a valve-regulated lead acid battery, which is mainly made of fine glass fibers and also includes inorganic powder and beaten natural pulp, wherein the amount of said inorganic powder is 5 to 30% by weight, the amount of said natural pulp is 3 to 20% by weight, and the density of the separator is from 0.165 g/cm$^3$ to 0.250 g/cm$^3$.

2. A separator for a valve-regulated lead acid battery as claimed in claim 1, wherein said fine glass fibers are acid resistant glass fibers having a mean fiber diameter equal to or smaller than 1 μm.

3. A separator for a valve-regulated lead acid battery as claimed in claim 1, wherein said inorganic powder is at least one selected from the group consisting of silica, titanium dioxide, and diatomaceous earth.

4. A separator for a valve-regulated lead acid battery as claimed in claim 1, wherein said inorganic powder is silica powder having a specific surface area equal to or larger than 100 m$^2$/g.

5. A separator for a valve-regulated lead acid battery as claimed in claim 1, wherein said natural pulp is beaten to the extent of having Canadian freeness equal to or lower than 250 ml.

6. A separator for a valve-regulated lead acid battery as claimed in claim 1, wherein the amount of said fine glass fibers is 50 to 92% by weight.

7. A separator for a valve-regulated lead acid battery as claimed in claim 1, wherein said natural pulp is soft wood pulp beaten by a beating device including a beater.

8. A separator for a valve-regulated lead acid battery as claimed in claim 1, wherein a part of said natural pulp is fibrillated cellulose.

9. A separator for valve-regulated lead acid battery as claimed in claim 8, wherein the amount of fibrillated cellulose is equal or less than 5% by weight, and the total amount of the fibrillated cellulose and the beaten natural pulp is equal to or less than 20% by weight.

10. A separator for a valve-regulated lead acid battery as claimed in claim 1, wherein the density of the separator is 0.165 to 0.250 g/cm$^3$.

11. A separator for a valve-regulated lead acid battery as claimed in claim 1, wherein the thickness of the separator is 0.4 to 0.8 mm.

* * * * *